United States Patent [19]

Kim

[11] Patent Number: 5,355,266

[45] Date of Patent: Oct. 11, 1994

[54] TAPE BACK-TENSION MECHANISM FOR A MAGNETIC REPRODUCING APPARATUS

[75] Inventor: Un-bae Kim, Seoul, Rep. of Korea

[73] Assignee: SamSung Electronics Co., Ltd., Suwon, Rep. of Korea

[21] Appl. No.: 64,863

[22] Filed: May 24, 1993

[51] Int. Cl.⁵ .................... G11B 15/24; B65H 16/10
[52] U.S. Cl. .................. 360/96.3; 242/235; 242/341
[58] Field of Search .......... 360/85, 93, 95, 96.3, 360/96.5; 242/199–204

[56] References Cited

U.S. PATENT DOCUMENTS

| | | | |
|---|---|---|---|
| 3,593,947 | 7/1971 | Johnson | 242/202 |
| 3,888,573 | 6/1975 | Easterly | 242/204 |
| 4,010,918 | 3/1977 | Kato | 242/191 |
| 4,223,855 | 2/1980 | Briedis | 242/204 |
| 4,260,120 | 4/1981 | Urata et al. | 242/201 |
| 4,491,885 | 1/1985 | Morikawa et al. | 360/85 |
| 4,685,008 | 8/1987 | Ohyama | 360/85 |
| 4,754,347 | 6/1988 | Kodama | 360/85 |
| 4,774,604 | 9/1988 | Hayashi et al. | 360/96.3 |
| 4,899,951 | 2/1990 | Okada et al. | 242/204 |
| 4,999,723 | 3/1991 | Yamanaka | 360/96.5 |
| 5,070,422 | 12/1991 | Sasaki et al. | 360/85 |
| 5,086,359 | 2/1992 | Tsuchiya | 360/96.3 |
| 5,114,093 | 5/1992 | Kurimaru et al. | 360/96.3 |
| 5,140,475 | 8/1992 | Tanaka | 242/204 |
| 5,150,265 | 9/1992 | Tanaka | 242/189 |
| 5,195,697 | 3/1993 | Ikeda | 242/204 |
| 5,289,989 | 3/1994 | Park | 242/201 |

*Primary Examiner*—A. J. Heinz
*Assistant Examiner*—Jefferson Evans
*Attorney, Agent, or Firm*—Robert E. Bushnell

[57] ABSTRACT

A tape back-tension mechanism for a magnetic recording/reproducing apparatus provides an instantaneous and secure braking force during mode shifting. In the mechanism, a take-up reel table includes a reel gear and a reel disk coupled to the reel gear and frictionally rotated by the reel gear. A predetermined force is applied to the take-up reel disk to prevent a magnetic tape from becoming loose due to the inertia created when a reel gear of a supply reel table stops during the shifting of the operational mode. Each of the reel disks accommodate a reel of a tape cassette. Further, the mechanism includes a fixed gear constantly engaged with a take-up reel gear, a floating gear constantly engaged with the fixed gear, the floating gear alternatively engaging and disengaging the take-up reel gear, and a connection lever for connecting the fixed gear and the floating gear.

27 Claims, 2 Drawing Sheets

TAPE BACK-TENSION MECHANISM FOR A MAGNETIC REPRODUCING APPARATUS

BACKGROUND OF THE INVENTION

The present invention claims priority under 35 U.S.C. §§119, and 120 based upon an application in the United States Patent & Trademark Office on 7 Apr. 1992, assigned Ser. No.:07/864,941, and an application filed in the Korea Industrial Property Office on 30 Aug. 1991, assigned Ser. No.:1991/15149.

The present invention relates to a magnetic recorder/reproducer, such as a tape recorder or a video player, and particularly to a tape back-tension mechanism wherein a constant tension is applied to a tape travelling in the counter-clockwise direction during review and rewind modes.

Generally, in magnetic recorders/reproducers, such as tape recorders and video players, when a tape cassette, having a magnetic tape therein, is seated on a supply reel table and a take-up reel table, the magnetic tape is loaded and is placed in close proximity to the outer periphery of a head drum. Also, in accordance with the operational mode, an idler gear selectively engages either the supply reel table or the take-up reel table. That is, the idler gear engages the take-up reel table during the play and fast-forward modes, thereby making the tape travel clockwise. Alternatively, (during review and rewind modes), the idler gear engages the supply reel table, making the tape travel counter-clockwise.

However, while the tape travels in a selected direction by the rotation of the selected reel table, the tape is loosened due to the inertia of the unselected reel table's rotation.

Accordingly, the tape becomes loose at the outer periphery of the head drum during the review mode, which causes noise. Moreover, since the tape is excessively drawn out from the unselected reel table during the rewind mode, noise occurs, and the tape may become tangled within the recorder/reproducer. In order to prevent such problems, a weak back-tension may be applied to the tape while the tape travels in the review or rewind mode. To provide the weak back-tension, a weak brake is installed, wherein the weak brake applies a force to the reel table which is not driven by the idle gear. In addition, the weak brake is not driven by the idler gear.

FIG. 1 is an art published in the U.S. Pat. No. 4,899,951, illustrating a braking system having a weak brake for putting a back-tension on a magnetic tape. Here, a cam gear 1 has an irregularly formed slot 2, and a roll follower 4 is inserted into slot 2, to be slid along the irregularly formed slot. Roll follower 4 is coupled to one arm of a Y-shaped brake-releasing member 3. Brake-releasing member 3 is fixed to be rotatable about a pivot 3a, and drawn toward the unreleased direction (clockwise) by a spring 3b. Due to this connection, roll follower 4 is maintained in slot 2 of cam gear 1. Brake releasers 3s and 3t are fixed on the other arm of brake-releasing member 3. Brake releasers 3s and 3t are connected to a reel brake 5s of a supply reel 7s and a reel brake 5t of a take-up reel 7t, respectively.

Also, brake releaser 3s is coupled with a weak brake 6, and fixed on a pivot 5a, coaxial with reel brake 5s. Reel brake 5s of supply reel 7s and reel brake 5s of take-up reel 7t are rotated about pivots 5a and 5a', respectively, and kept under pressure by springs 5b and 5b', respectively, thus counteracting the rotation of reels 7s and 7t, respectively. In the same manner, weak brake 6 is kept under pressure by spring 6a, to counteract the rotation of supply reel 7s.

FIG. 1 shows the fast-forward mode of the system's operation. As cam gear 1 is rotated clockwise, brake-releasing member 3 rotates counter-clockwise. Then, reel brakes 5s and 5t are released, and accordingly, only weak brake 6 applies a gentle braking force to supply reel 7s. As a result, back-tension is provided to the tape during the fast-forward mode due to the braking force of weak brake 6, thereby preventing the tape from being drawn out.

However, the brake system with the weak brake apparatus having the above structure requires many parts to selectively operate weak brake 6 according to respective modes. That is, a driving source is separately required for driving the cam gear. Further, a cam gear with an irregularly shaped slot, as well as a brake-releasing member connected to the cam gear, are also required to operate the weak brake in accordance with the cam gear's rotation.

Therefore, the apparatus is complicated in its structure, and requires excessive space for installation, so that its manufacture and assembly become overly fastidious. These drawbacks, in turn, lead to deterioration of operation and degraded accuracy for the end product.

SUMMARY OF THE INVENTION

The present invention is devised to solve the above-described problems. Accordingly, it is an object of the present invention to provide a tape back-tension mechanism for a magnetic recording apparatus, having a simplified structure and requiring less installation space, with a weak brake having a secure braking force.

It is another object of the present invention to provide a tape back-tension mechanism, wherein a weak brake can be operated by the rotation of the reel table without requiring a separate driving source.

To achieve these and other objects of the present invention, there is provided a tape backtension mechanism for a magnetic recording/reproducing apparatus having a structure wherein a predetermined force is imposed on a tape reel of a tape cassette to prevent a magnetic tape from becoming loose due to the inertia created when a supply reel gear of a supply reel table stops during the shifting of operational modes. Each of the above reel tables include a reel disk for seating either a supply reel or a take-up reel, and a reel gear coupled to the reel disk and frictionally rotated against the reel disk. The mechanism further comprises: a fixed gear permanently engaged with the take-up reel gear, a floating gear permanently engaged with the fixed gear and alternatively engaged and disengaged with the take-up reel gear, and a connection lever for connecting the fixed gear and the floating gear.

BRIEF DESCRIPTION OF THE DRAWINGS

Other objects and advantages of the present invention will become more apparent from the following description with reference to accompanying drawings, in which.

DETAILED DESCRIPTION OF THE INVENTION

Figure 1:
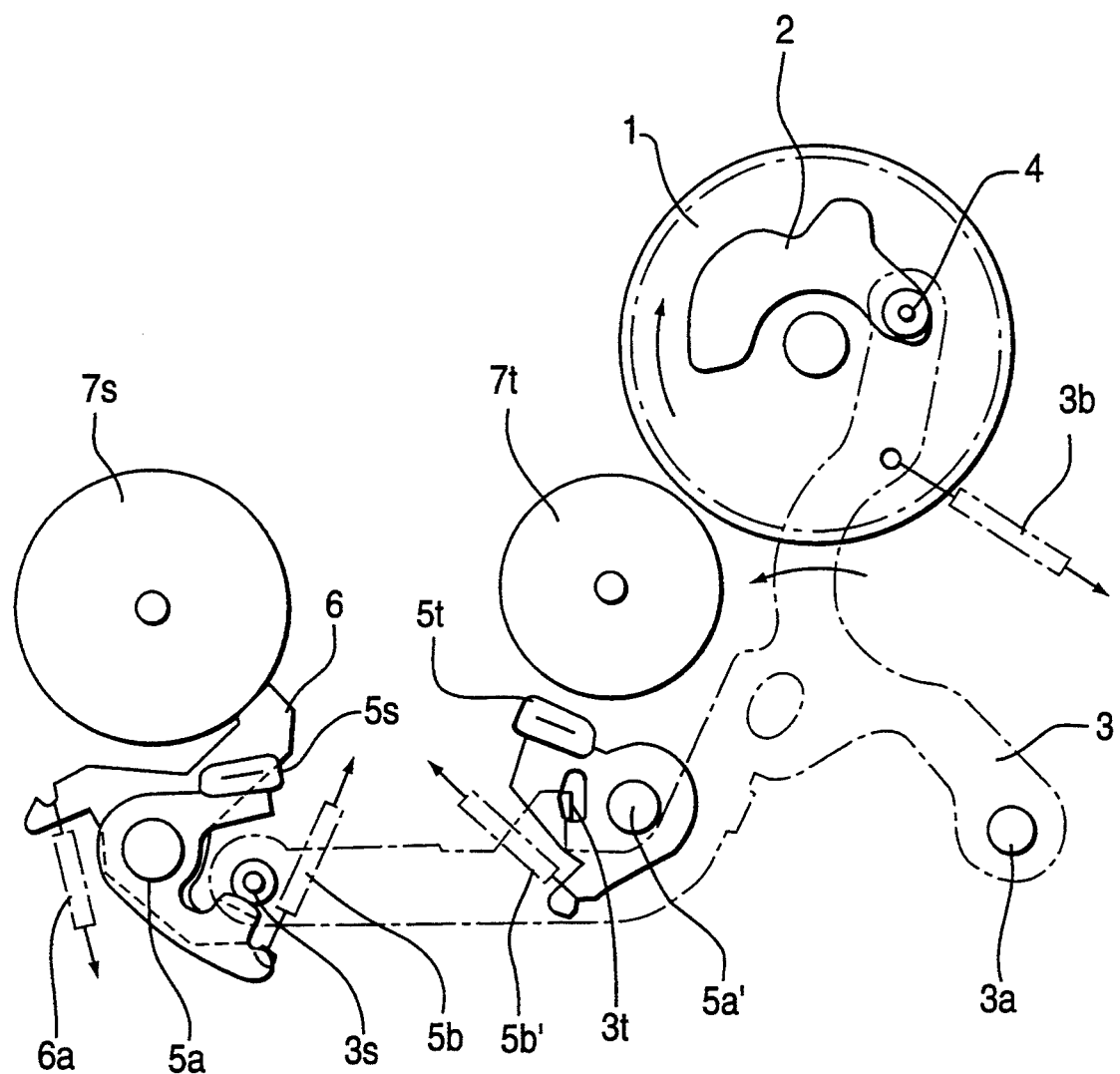
FIG. 1 shows a conventional brake system.
Figure 2:
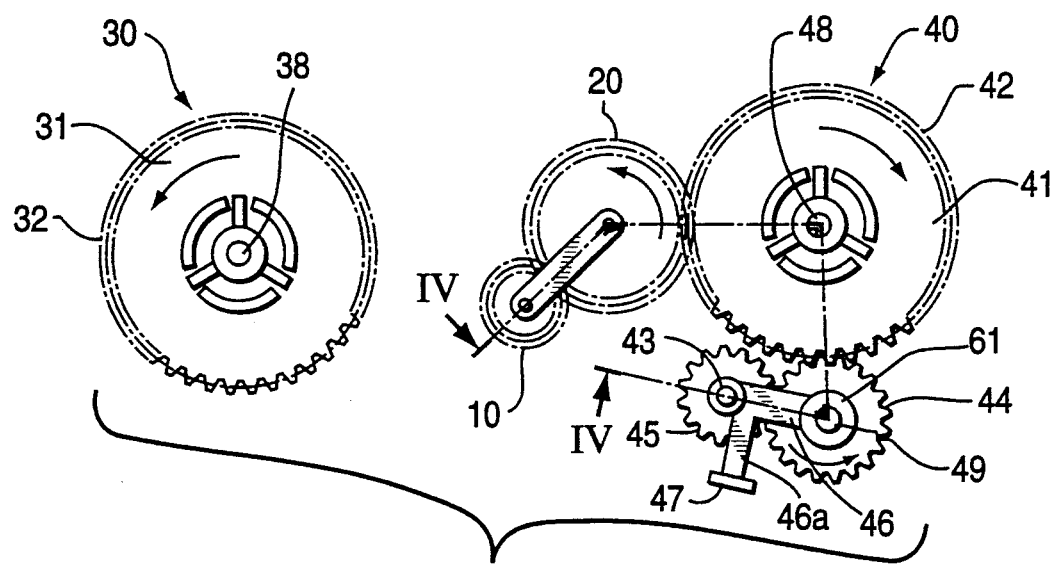
FIG. 2 is a schematic view of a tape back-tension mechanism according to the present invention in the play or fast-forward position.
Figure 3:
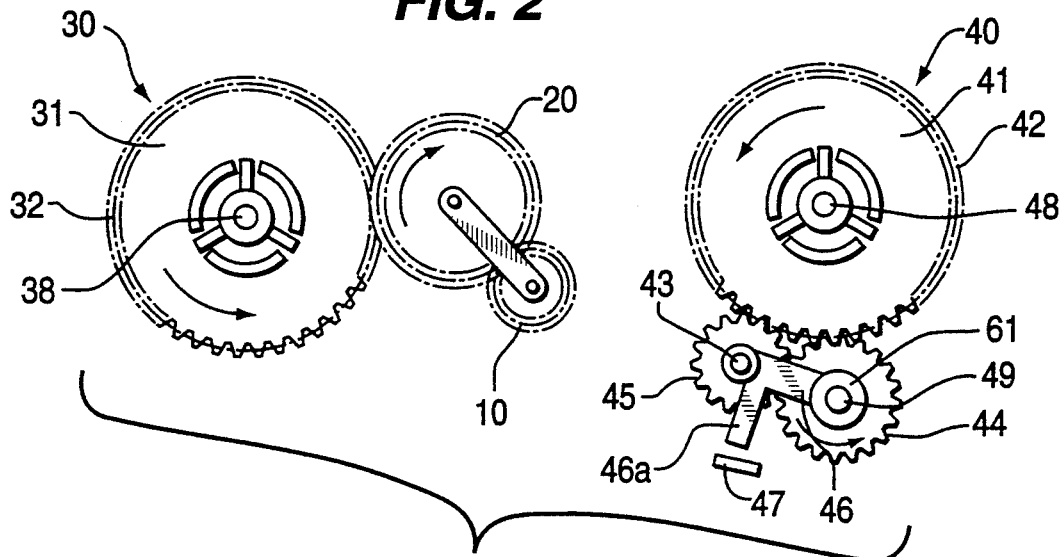
FIG. 3 is a schematic view of the tape back-tension mechanism according to the present invention in the review or rewind position.
Figure 4:
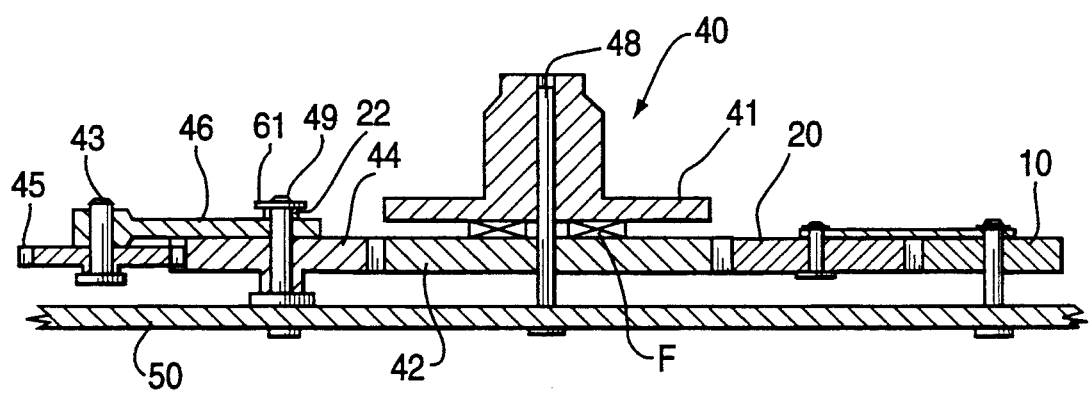
FIG. 4 is a sectional view exploding the IV—IV section of FIG. 3.

FIGS. 2, 3 and 4 illustrate a tape back-tension mechanism according to the present invention. Here, an idler gear 20 is installed between a supply reel table 30, which accommodates a supply reel, and a take-up reel table 40, which accommodates a take-up reel of a tape cassette, the idler gear selectively transferring motive power to reel tables 30 and 40, in dependence upon a selected mode. Idler gear 20 is permanently engaged with a driving gear 10 which is driven by a power source, and is moveable in dependence upon the rotational direction of driving gear 10. Reel tables 30 and 40 include respective reel disks 31 and 41 for accommodating the respective reels of a tape cassette, and respective reel gears 32 and 42 having gear wheels along their outer circumferences. Reel gears 32 and 42 are installed by being pressed around respective axes 38 and 48, and reel disks 31 and 41 are coaxially installed with respect to the respective reel gears 32 and 42, the reel disks 31 and 41 being rotatable about their respective axes. Also, referring to FIG. 4, friction felt F is provided between reel gear 42 and reel disk 41. Idler gear 20 engages with reel gears 32 and 42 of respective reel tables 30 and 40 in accordance with a selective mode. Further, the weak brake for providing a gentle braking force which is the characteristic feature of the present invention and formed by the interaction between the fixed gear, the floating gear, the take-up reel gear and the take-up reel disk, is installed as follows.

Fixed gear 44 is fixed to a deck 50 to be constantly engaged with reel gear 42. Here, reference numeral 49 is a fixed axis for rotatably supporting fixed gear 44. Floating gear 45 is constantly engaged with fixed gear 44. At this time, floating gear 45 is rotatable on floating axis 43 and installed on an end of connection lever 46. The other end of connection lever 46 is rotatable on fixed axis 49 by push-fit. Here, connection lever 46 is slidably installed on the upper surface of fixed gear 44. The separation of connection lever 46 from fixed axis 49 is prevented by washer 61. A compression spring 22 is installed between washer 61 and connection lever 46. Thus, connection lever 36 is frictionally rotated with respect to fixed gear 44. The compression spring 22 aids in transferring the rotating force of the fixed gear 44 to the connection lever 46 through friction, thereby causing the connection lever 46 to rotate in the same rotational direction as fixed gear 44. The frictional force between the fixed gear 44 and connection lever 46 is smaller than the turning force of fixed gear 44. Also, floating gear 45 is movable in dependence upon the rotational direction of fixed gear 44, that is, connection lever 46 is rotated in the same direction as the rotation of fixed gear 44, due to the friction caused by rotation of fixed gear 44. Accordingly, floating gear 45 alternatively engages and disengages reel gear 42. Preferably, protrusion 46a is formed extending from connection lever 46 with stopper 47 being formed on deck 50 and spaced apart from the protrusion 46a by a predetermined distance. Also, backlash is prevented by providing a clearance at the rear portion of the teeth of the floating gear 45 and fixed gear 44, and the teeth of floating gear 45 and take-up reel gear 42, while the gears are engaged with each other.

Now, the operation of the apparatus will be described.

As shown in FIG. 2, in the play and fast-forward modes, idler gear 20, rotated by driving gear 10, engages reel gear 42 of take-up reel table 40. At the same time, reel gear 42 is rotated clockwise, and fixed gear 44 is rotated counter-clockwise, thus rotating floating gear 45 clockwise. The frictional force between the fixed gear 44 and the connection lever 46 disengages floating gear 45 from reel gear 42. Here, since protrusion 46a of connection lever 46 is blocked by stopper 47, floating gear 45 is prevented from becoming excessively separated, and excessive rotation of floating gear 45 around fixed gear 44 is prevented.

As a result, in the play and fast-forward modes, take-up reel disk 41 is rotated without being under the frictional load, created between the take-up reel disk 41 and reel gear 42 by friction felt F, as reel gear 42 is allowed to freely rotate.

In the review or rewind mode shown in FIG. 3, idler gear 20 is rotated while being engaged with supply reel gear 32. Thus, by the above-described operation, take-up reel disk 41 is rotated while being under the frictional load created between the take-up reel disk 41 and the reel gear 42 by friction felt F. For this reason, when the operational mode is shifted from the review or rewind mode to the stop mode, back-tension is supplied to the magnetic tape by the frictional load between the take-up reel disk 41 and the reel gear 42 regardless of the rotational inertia of supply reel disk 31, so that the tape is prevented from becoming loose.

As described above, the tape back-tension mechanism is provided with a fixed gear 44 being constantly meshed with reel gear 42 and a floating gear 45 constantly meshed with fixed gear 44, the floating gear 45 alternatively engaging and disengaging reel gear 42, in accordance with the rotational direction of fixed gear 44. The tape back-tension mechanism has a simplified structure and requires a markedly reduced space. Further, since reel gear 42, fixed gear 44, and floating gear 45 are respectively meshed with one another, the braking force, i.e., the frictional load between the reel gear 42 and the unselected reel disk 41 is instantaneously and precisely supplied in dependence upon the rotational direction of reel gear 42, while converting the mode from the review or rewind mode to the stop mode. Moreover, the fixed gear and the floating gear can be operated in accordance with the rotational direction of the reel gear which is rotated by the idler gear. Therefore, a weak brake, i.e., the fixed gear and the floating gear operating in conjunction with the take-up reel gear and take-up reel disk, can be operated without requiring a separate power source.

I claim:

1. A tape back-tension mechanism for a tape handling apparatus, for applying a predetermined force to one of two reels of a tape cassette to prevent a tape from becoming loose due to inertia occurring during shifting between operational modes of the apparatus, said tape back-tension mechanism comprising:

a supply reel gear and a take-up reel gear fixed to a deck of the apparatus;

a supply reel disk and a take-up reel disk, said supply reel disk and said take-up reel disk frictionally coupled to and rotatable with said supply reel gear and said take-up of reel gear, respectively, each one of said reel disks accommodating a corresponding one of the reels of the tape cassette;

a fixed gear rotationally engaged with said take-up reel gear;

a floating gear rotationally engaged with said fixed gear, and engaging said take-up reel gear when said take-up reel gear rotates in a first direction and disengaging said take-up reel gear when said take-up reel gear rotates in a second direction; and a connection lever, said connection lever connecting said fixed gear with said floating gear, and pivotally supporting said floating gear about an axis of rotation of said fixed gear;

wherein said take-up reel gear stops when engaged with said floating gear.

2. The tape back-tension mechanism for a tape handling apparatus as claimed in claim 1, further comprised of:

a protrusion formed from said connection lever; and a stopper placed in a rotating path of said protrusion to limit pivotal movement of said floating gear away from said take-up reel gear due to rotation of said fixed gear.

3. The tape-back tension mechanism as claimed in claim 2, further comprising:

an idler gear; and a driving gear engaged with said idler gear;

wherein said idler gear alternately drives said supply reel gear and said take-up reel gear in accordance with selected said operational modes.

4. The tape-back tension mechanism as claimed in claim 1, further comprising:

an idler gear; and a driving gear engaged with said idler gear;

wherein said idler gear alternately drives said supply reel gear and said take-up reel gear in accordance with selected said operational modes.

5. The tape-back tension mechanism as claimed in claim 1, further comprising:

a friction member located between said take-up reel disk and said take-up reel gear, to transfer a frictional force from said take-up reel gear to said take-up reel disk.

6. The tape-back tension mechanism as claimed in claim 1, further comprising:

stop means for maintaining an end of said connection lever on said axis of rotation of said fixed gear; and a spring located between said stop means and said connection lever, said compression spring generating a frictional force between said compression spring and said fixed gear.

7. The tape-back tension mechanism for a tape handling apparatus, for providing a braking force to one of two reels of a tape cassette in order to prevent loosening of a tape during operational mode changes, said tape back-tension mechanism comprising:

a supply reel gear and a take-up reel gear rotatably disposed on a deck of the apparatus;

a supply reel disk and a take-up reel disk, said supply reel disk and said take-up reel disk being mounted coaxially on said supply reel gear and said take-up reel gear, respectively, said supply reel disk and said take-up reel disk accommodating a corresponding one of the reels and frictionally rotatable with said supply reel gear and said take-up reel gear, respectively;

a fixed gear rotationally engaged with said take-up reel gear; and a floating gear rotationally engaged with said fixed gear, and engaging said take-up reel gear when said take-up reel gear rotates in a first direction and disengaging said take-up reel gear when said take-u reel gear rotates in a second direction;

wherein said take-up reel gear stops when engaged with said floating gear.

8. The tape-back tension mechanism as claimed in claim 7, further comprising:

a connection lever connecting said fixed gear with said floating gear, said connection lever pivotally supporting said floating gear about an axis of rotation of said fixed gear.

9. The tape-back tension mechanism as claimed in claim 7, further comprising:

a friction member located between said take-up reel disk and said take-up reel gear, to transfer a frictional force from said take-up reel gear to said take-up reel disk.

10. The tape-back tension mechanism for a a supply reel gear and a take-up reel gear;

an idler gear for alternately engaging said supply reel gear and said take-up reel gear in dependence upon an operational mode of the apparatus;

a driving gear engaging said idler gear for applying a motive force to said idler gear;

a supply reel disk and a take-up reel disk, said supply reel disk and said take-up reel disk frictionally coupled and rotatable with said supply reel gear and said take-up reel gear, respectively, each one of said supply reel disk and said take-up reel disk accommodating a respective reel of a tape cassette;

a fixed gear rotationally engaged with said take-up reel gear;

a floating gear rotationally engaged with said fixed gear, and engaging said take-up reel gear when said take-up reel gear rotates in a first direction and disengaging said take-up reel gear when said take-up reel gear rotates in a second direction;

a connection lever connecting said fixed gear with said floating gear, said connection lever, through a force, pivotally moving said floating gear about an axis of rotation of said fixed gear;

wherein said take-up reel gear stops when engaged with said floating gear.

11. The tape back-tension mechanism as claimed in claim 10, further comprising a protrusion formed from said connection lever; and a stopper placed in a rotating path of said protrusion to limit pivotal movement of said floating gear away from said take-up reel gear due to rotation of said fixed gear.

12. The tape-back tension mechanism as claimed in claim 10, further comprising:

stop means for maintaining an end of said connection lever on said axis of rotation of said fixed gear; and a spring located between said stop means and said connection lever, said spring generating a frictional force between said spring and said fixed gear.

13. A method for maintaining a tension on a tape of a tape cassette placed in an apparatus, comprising:

alternately driving a take-up reel gear and a supply reel gear with a driving gear in dependence upon an operational mode of the apparatus;

driving a fixed gear, said fixed gear constantly engaged with said take-up reel gear;

pivotally moving a floating gear rotationally engaged with said fixed gear about an axis of rotation of said fixed gear, said floating gear engaging said take-up reel gear when said take-up reel gear is rotated in a first direction and disengaging said take-up reel gear when said take-up reel gear is rotated in said second direction, stopping said take-up reel gear engaged with said floating gear; and frictionally applying a force to a take-up reel disk mounted on said stopped take-up reel gear.

14. The method as claimed in claim 13, further comprising:

limiting said pivotal movement of said floating gear by means of a stopper when said floating gear disengages from said take-up reel gear.

15. The method as claimed in claim 13, further comprising:

connecting said floating gear to said fixed gear with connector means in order to pivot said floating gear about said axis of rotation of said fixed gear.

16. The method as claimed in claim 15, further comprising:

alternately limiting said pivotal movement of said floating gear by a protrusion on said connector means contacting a stopper.

17. The method as claimed in claim 15, further comprising:

inserting a friction member between said take-up reel disk and said take-up reel gear to frictionally load said take-up reel disk.

18. The method as claimed in claim 13, wherein the step of rotating said floating gear further comprises stopping said take-up reel gear when said floating gear meshes with said take-up reel gear.

19. A tape-tension mechanism to prevent tape of a tape cassette from becoming loose during shifting between operational modes, comprising:

a take-up reel gear and a supply reel gear;

driving means to alternately apply a rotational force to said take-up reel gear and said supply reel gear in dependence upon said operational modes;

take-up reel seating means and supply reel seating means coaxially located on and frictionally coupled to said take-up reel gear and said supply reel gear, respectively, for accommodating a take-up reel and a supply reel of the tape cassette, respectively; and stopping means for stopping rotation of one of said take-up reel gear and said supply reel gear when said one of said take-up reel gear and said supply reel gear is not being rotated by said driving means, said stopping means comprising:

a first gear rotationally engaging one of said take-up reel gear and said supply reel gear; and a second gear rotationally engaging said first gear, and engaging said one of said take-up reel gear and said supply reel gear when said one of said take-up reel gear and said supply reel gear rotates in a first direction and disengaging said one of said take-up reel gear and said supply reel gear when said one of said take-up reel gear and said supply reel gear rotates in a second and opposite direction.

20. The tape-tension mechanism of claim 19, further comprised of:

a first reel table rotatably drivable by said take-up reel gear;

a second reel table rotatably drivable by said supply reel gear;

said first reel table and said second reel table disposed to receive the tape cassette; and said stopping means creating a frictional load between said one of said take-up reel gear and said supply reel gear and a corresponding one of said first reel table and said second reel table while said second gear engages said one of said take-up reel rear and said supply reel gear.

21. A tape tensioning mechanism for controlling a rotation of a tape reel of a tape cassette, comprising:

a first reel gear disposed for rotation about an axis;

a first reel disk coaxial with said first reel gear, for seating the tape reel and frictionally driven for rotation with said first reel gear;

a first fixed gear disposed for rotational engagement with said first reel gear;

a floating gear disposed in rotational engagement with said first fixed gear and supported for movement into engagement with and away from said first reel gear; and a driving gear disposed for selective engagement with said first reel gear to rotate said first reel gear in a first direction, such that when said driving gear is in driving engagement with said first reel gear to rotate said first reel gear in said first direction, the rotation of said first reel gear and the rotationally engaged first fixed gear causes said first floating gear to move away from said first reel gear, and when said first reel gear is rotated in a direction opposite from said first direction, the rotation of said first reel gear and the rotationally engaged first fixed gear causes said first floating gear to move into engagement with said first reel gear to prevent rotation of said first reel gear, said first reel disk being rotatable against friction between said first reel disk and said first reel gear to apply tension to the tape on the tape reel.

22. The tape tensioning mechanism of claim 21, further comprising a connector supporting said first floating gear, for constant engagement of said first floating gear with said first fixed gear and pivotal movement into engagement with and away from said first reel gear.

23. The tape tensioning mechanism of claim 22, further comprising stop means co-acting with said connector to limit said movement of said first floating gear away from said first reel gear.

24. The tape tensioning mechanism of claim 22, further comprising:

resilient means for biasing said connector against said first fixed gear, to generate a frictional force between said connector and said first fixed gear.

25. The tape tensioning mechanism of claim 24, wherein said resilient means is a spring.

26. The tape tensioning mechanism of claim 21, further comprising stop means co-acting with said first floating gear to limit said movement of said first floating gear away from said first reel gear.

27. A tape tensioning mechanism for an apparatus having a supply reel disk and a take-up reel disk, comprising:

a supply reel gear for frictionally rotating said supply reel disk;

a take-up reel gear for frictionally rotating said take-up reel disk;

a drive gear selectively engageable with said supply reel gear to rotate said supply reel gear in a first direction and with said take-up reel gear to rotate said take-up reel gear in a second direction;

a first gear for rotational engagement with said take-up reel gear; and a floating gear disposed in rotational engagement with said first gear and supported for pivotal movement about a rotational axis of said first gear into engagement with and away from said take-up reel gear;

such that when said driving gear is in driving engagement with said supply reel gear to rotate said supply reel gear in said first direction, the rotation of said take-up reel gear and the rotationally engaged first gear causes said floating gear to pivotally move into engagement with said take-up reel gear, and when said take-up reel gear is rotated in said second direction by said driving gear, the rotation of said take-up reel gear and the rotationally engaged first gear causes said floating gear to pivotally move away from said take-up reel gear to prevent rotation of said take-up reel gear, said take-up reel gear being rotatable against the friction between said take-up reel disk and said take-up reel gear to apply tension to the tape.

* * * * *

UNITED STATES PATENT AND TRADEMARK OFFICE
CERTIFICATE OF CORRECTION

PATENT NO. : 5,355,266
DATED : October 11, 1994
INVENTOR(S) : Un-bae Kim

It is certified that error appears in the above-identified patent and that said Letters Patent is hereby corrected as shown below:

On the title page, item [30] Foreign Application Priority Data should read -- Aug. 30, 1991    Republic of Korea    91-15149 --

Item [63] should read --Continuation -in- part of Ser. No. 864,941. April 17, 1992 abandoned--.

Signed and Sealed this

Twenty-first Day of March, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,355,266
DATED : 11 October 1994
INVENTOR(S) : Un-Bae KIM

It is certified that error appears in the above-indentified patent and that said Letters Patent is hereby corrected as shown below:

Claim 10, Column 6, line 20, after " a ", insert --tape apparatus, comprising--:

Signed and Sealed this

Twenty-first Day of October 1997

Attest:

BRUCE LEHMAN

Attesting Officer   Commissioner of Patents and Trademarks